(12) United States Patent
Chin et al.

(10) Patent No.: US 7,947,767 B2
(45) Date of Patent: *May 24, 2011

(54) ELECTRET MATERIALS

(75) Inventors: Hui Chin, Katonah, NY (US); Matthew E. Gande, Norwalk, CT (US); Andrew J. Leggio, Franklin Square, NY (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,755

(22) Filed: Jan. 12, 2010

(65) Prior Publication Data

US 2010/0112886 A1    May 6, 2010

Related U.S. Application Data

(63) Continuation of application No. 11/732,396, filed on Apr. 3, 2007, now Pat. No. 7,666,931.

(60) Provisional application No. 60/791,047, filed on Apr. 11, 2006.

(51) Int. Cl.
*C08K 5/35*    (2006.01)

(52) U.S. Cl. ............ 524/95; 524/99; 524/141; 524/214; 307/400

(58) Field of Classification Search .................. 524/95, 524/99, 141, 214; 307/400
See application file for complete search history.

(56) References Cited

U.S. PATENT DOCUMENTS

| | | | |
|---|---|---|---|
| 5,057,710 A | 10/1991 | Nishiura et al. | |
| 5,556,618 A | 9/1996 | Ando et al. | |
| 6,123,752 A | 9/2000 | Wu et al. | |
| 6,743,464 B1 | 6/2004 | Insley et al. | |
| 6,969,484 B2 | 11/2005 | Horiguchi et al. | |
| 2003/0216494 A1 | 11/2003 | Roth et al. | |
| 2003/0225191 A1 * | 12/2003 | Gugumus | 524/99 |

* cited by examiner

*Primary Examiner* — Peter D Mulcahy
(74) *Attorney, Agent, or Firm* — Tyler A. Stevenson

(57) ABSTRACT

Disclosed are electret materials with outstanding thermal and charge stability. The electret materials comprise a melt blend of a thermoplastic polymer and one or more hindered hydroxylamine ester compounds that comprise at least one moiety of the formula I

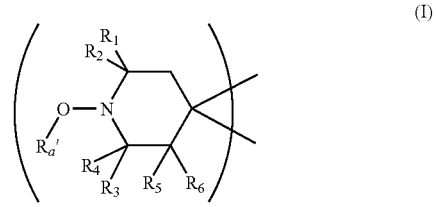

(I)

where $R_a'$ is a monoacyl or diacyl radical; $R_1$-$R_4$ are each $C_1$-$C_6$alkyl; and $R_5$ and $R_6$ are each, independently of one another, hydrogen, $C_1$-$C_6$alkyl or $C_6$-$C_{10}$aryl; or $R_5$ and $R_6$ are together oxygen. The melt blends are subjected to an electret treatment, for example a corona treatment. The electret materials are for example nonwoven polyolefin webs and are employed as filter materials, wipes, absorbent materials, filter masks, acoustic materials, printing substrates, measuring devices or contactless switches. The present electret materials may also comprise a further additive selected from the group consisting of the hindered amine light stabilizers, the hydroxyphenylalkylphosphonic esters or monoesters and the aromatic trisamide nucleating agents.

10 Claims, No Drawings

ELECTRET MATERIALS

This application is a continuation of U.S. application Ser. No. 11/732,396, filed Apr. 3, 2007, now U.S. Pat. No. 7,666,931, which claims benefit of U.S. provisional app. No. 60/791,047, filed Apr. 11, 2006, the contents of which are incorporated by reference.

The present invention is aimed at electret materials having excellent thermal stability and charge stability. The electret materials are for example polyolefin fibers or films and are suitably employed as filter materials, wipes, absorbent materials, filter masks, acoustic materials, printing substrates, measuring devices or contactless switches.

BACKGROUND

U.S. Pat. No. 5,057,710 teaches electret materials comprising hindered amines, nitrogen containing hindered phenols or metal-containing hindered phenols.

U.S. Pat. No. 5,556,618 discloses antibacterial electret materials.

U.S. Pat. No. 6,123,752 teaches high efficiency filter medium containing a performance enhancing additive.

U.S. Pat. No. 6,743,464 teaches a method of making electrets through vapor condensation.

U.S. Pat. No. 6,969,484 discloses a method of making electret.

U.S. published app. No. 2003/0216494 teaches hindered hydroxylamine ester compounds.

SUMMARY

Disclosed is an electret material with enhanced thermal and charge stability, which material has been subjected to an electret treatment, comprising
a thermoplastic polymer and
incorporated therein, an effective stabilizing amount of at least one hindered hydroxylamine ester compound, which compound contains one or more moieties of the formula I

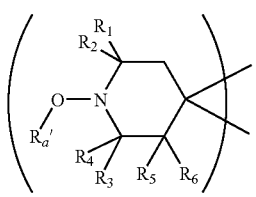

where
$R_a'$ is a monoacyl or diacyl radical;
$R_1$-$R_4$ are each $C_1$-$C_6$alkyl; and
$R_5$ and $R_6$ are each, independently of one another, hydrogen, $C_1$-$C_6$alkyl or $C_6$-$C_{10}$aryl; or
$R_5$ and $R_6$ are together oxygen.

Also disclosed is a method for preparing an electret material with enhanced thermal and charge stability, which method comprises
melt blending a thermoplastic polymer with an effective stabilizing amount of at least one hindered hydroxylamine ester compound, which compound contains one or more moieties of the formula I

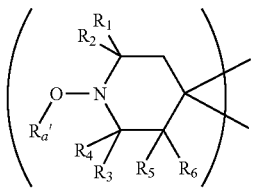

where
$R_a'$ is a monoacyl or diacyl radical;
$R_1$-$R_4$ are each $C_1$-$C_6$alkyl; and
$R_5$ and $R_6$ are each, independently of one another, hydrogen, $C_1$-$C_6$alkyl or $C_6$-$C_{10}$aryl; or
$R_5$ and $R_6$ are together oxygen
and
subjecting the blend to an electret treatment.

DETAILED DISCLOSURE

The thermoplastic polymer is a non-conductive polymer that has the capability of possessing a non-transitory or long-lived trapped charge. The polymer is for example a polyolefin, a halogenated vinyl polymer (e.g. polyvinyl chloride), polystyrene, polycarbonate, a polyester (e.g. polyethylene terephthalate), a polyamide or a fluoropolymer (e.g. polytetrafluoroethylene).

The thermoplastic polymers are for example propylene homopolymers, propylene copolymers and polypropylene blends. Propylene copolymers may contain various proportions up to 90%, preferably up to 50%, of comonomers. Examples of comonomers are: olefins such as 1-olefins, e.g. ethylene, 1-butene, 1-pentene, 1-hexene, 1-heptene or 1-octene, isobutylene, cycloolefins, e.g. cyclopentene, cyclohexene, norbornene or ethylidenenorborne, dienes such as butadiene, isoprene, 1,4-hexadiene, cyclopentadiene, dicyclopentadiene or norbornadiene; also acrylic acid derivatives and unsaturated carboxylic anhydrides such as maleic anhydride.

Polypropylene blends which can be used are mixtures of polypropylene with polyolefins. Examples are blends of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene.

The polymer is especially a polyolefin, for example polypropylene, poly(4-methyl-1-pentene) or linear low density polyethylene, or blends or copolymers thereof. The polymer may be a blend of a polyolefin and a polymer that contains polar groups, for example a polyester or a polyamide.

The electret material comprising the thermoplastic material is in the form of a nonwoven web, a film, or a woven fabric. The electet material is in particular a nonwoven fibrous web.

The electret treatment may be any known treatment. Electret treatments are taught for example in U.S. Pat. Nos. 5,057,710, 5,556,618, 6,123,752, 6,743,464, 6,969,484, 6,284,339, 5,256,176 and 6,926,961, the disclosures of which are hereby incorporated by reference. The electret treatment is for example hydro-charging, tribo-electric charging or corona treatment. The electret treatment is especially a corona treatment.

An electret material according to this invention is a thermoplastic material that has been subjected to an electret treatment.

The hindered hydroxylamine ester compounds are taught for example in U.S. published app. No. 2003/0216494, the disclosure of which is hereby incorporated by reference.

The present hydroxylamine ester compounds contain at least one moiety of the formula I

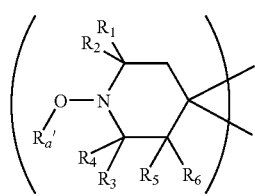

where
$R_a'$ is a monoacyl or diacyl radical;
$R_1$-$R_4$ are each $C_1$-$C_6$alkyl; and
$R_5$ and $R_6$ are each, independently of one another, hydrogen, $C_1$-$C_6$alkyl or $C_6$-$C_{10}$aryl; or
$R_5$ and $R_6$ are together oxygen.

Preference is given to compounds containing the moiety I, in which $R_a'$ is $C_2$-$C_{18}$alkanoyl or $C_3$-$C_6$alkenoyl.

A monoacyl radical $R_a'$ may be, for example, the acyl radical derived from a monobasic organic acid comprising C radicals and an acid function, e.g. one of the above-defined acyl radicals of the partial formulae —C(=O)—H, —C(=O)—$C_1$-$C_{19}$alkyl, —C(=O)—$C_2$-$C_{19}$alkenyl, —C(=O)—$C_2$-$C_4$alkenyl-$C_6$-$C_{10}$aryl, —C(=O)—$C_6$-$C_{10}$aryl, —C(=O)—O—$C_1$-$C_6$alkyl, —C(=O)—O—$C_6$-$C_{10}$aryl, —C(=O)—NH—$C_1$-$C_6$alkyl, —C(=O)—NH—$C_6$-$C_{10}$aryl and —C(=O)—N($C_1$-$C_6$alkyl)$_2$.

When $R_a'$ is a monoacyl radical, hydroxylamine esters containing group (I) are monomeric or dimeric structures. Thus, dimeric structures have suitable bivalent substituents in the 4-position and these are in turn substituted in the terminal position by compounds (I) via their 4-position (α,ω-substitution).

The term hydroxylamine ester encompasses both monomeric and oligomeric compounds and also polymers formed by groups of the formula I.

A diacyl radical $R_a'$ may be, for example, the diacyl radical derived from a monobasic organic acid having C radicals and two acid functions, e.g. a diacyl radical derived from an aliphatic, aromatic or cycloaliphatic dicarboxylic acid.

Suitable aliphatic dicarboxylic acids have from 2 to 40 C-atoms, e.g. oxalic acid, malonic acid, dimethylmalonic acid, succinic acid, pimelic acid, adipic acid, trimethyladipic acid, sebacic acid, azelaic acid and dimeric acid (dimerization products of unsaturated aliphatic carboxylic acids such as oleic acid), alkylated malonic and succinic acids, e.g. octadecylsuccinic acid. Suitable cycloaliphatic dicarboxylic acids are, for example, 1,3-cyclobutanedicarboxylic acid, 1,3-cyclopentanedicarboxylic acid, 1,3- and 1,4-cyclohexanedicarboxylic acid, 1,3- and 1,4-(di-carboxymethyl)cyclohexane or 4,4'-dicyclohexyldicarboxylic acid.

Suitable aromatic dicarboxylic acids are, for example, terephthalic acid, isophthalic acid, o-phthalic acid, and also 1,3-, 1,4-, 2,6- or 2,7-naphthalenedicarboxylic acid, 4,4'-biphenyldicarboxylic acid, bis(4-carboxyphenyl)sulfone, 4,4'-benzophenonedicarboxylic acid, 1,1,3-trimethyl-5-carboxy-3-(p-carboxylphenyl)indane, bis(4-carboxyphenyl)ether, bis(p-carboxyphenyl)methane or bis(p-carboxyphenyl)ethane.

Preference is given to aromatic dicarboxylic acids, in particular terephthalic acid, isophthalic acid and 2,6-naphthalenedicarboxylic acid.

Further suitable dicarboxylic acids are ones containing —CO—NH— groups. These are described in U.S. Pat. No. 4,002,600. Also suitable are dicarboxylic acids containing N-heterocyclic rings, e.g. those derived from carboxyalkylated, carboxyphenylated or carboxylbenzylated monoamine-s-triazinedicarboxylic acids (cf. U.S. Pat. Nos. 3,697,520 and 4,034,019), monohydantoins or bishydantoins, halogenated or unhalogenated benzimidazoles or parabanic acid. The carboxyalkyl groups may contain from 3 to 20 C-atoms.

When $R_a'$ is a diacyl radical and a suitable functional group, e.g. hydroxy or amino, is present in the 4-position, compounds containing groups of the formula I are polymeric structures, e.g. polyesters, polyesteramides, polyurethanes, polycarbonates or polyimide esters.

For example, the hindered hydroxylamine esters are of the formula IA

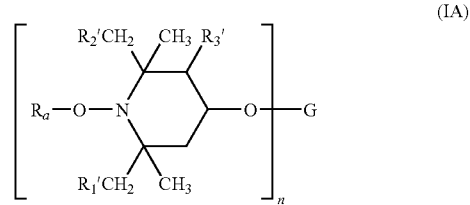

where
n is an integer from 1 to 4,
$R_a$ is acyl and $R_1'$, $R_2'$ and $R_3'$ are each, independently of one another, hydrogen or methyl; and
G has the following meanings:
when n=1,
G is hydrogen, $C_1$-$C_{18}$alkyl which may be interrupted by one or more oxygen atoms, 2-cyanoethyl, benzyl, glycidyl, the monovalent radical of an aliphatic, cycloaliphatic, araliphatic, unsaturated or aromatic carboxylic acid, carbamic acid or phosphorus-containing acid or a monovalent silyl radical, preferably the acyl radical of an aliphatic carboxylic acid having from 2 to 18 C-atoms, of a cycloaliphatic carboxylic acid having from 7 to 15 C-atoms, of an α,β-unsaturated carboxylic acid having from 3 to 5 C-atoms or of an aromatic carboxylic acid having from 7 to 15 C-atoms, where the carboxylic acid may be substituted in the aliphatic, cycloaliphatic or aromatic part by from 1 to 3 —COOZ$^1$ groups, where $Z^1$ is hydrogen, $C_1$-$C_{20}$alkyl, $C_3$-$C_{12}$alkenyl, $C_5$-$C_7$cycloalkyl, phenyl or benzyl; or
when n=2,
G is $C_2$-$C_{12}$alkylene, $C_4$-$C_{12}$alkenylene, xylylene, the divalent acid radical of an aliphatic, cycloaliphatic, araliphatic or aromatic dicarboxylic acid, dicarbamic acid or phosphorus-containing acid, or a divalent silyl radical, preferably the acyl radical of an aliphatic dicarboxylic acid having from 2 to 36 C-atoms, of a cycloaliphatic or aromatic dicarboxylic acid having from 8 to 14 C-atoms or of an aliphatic, cycloaliphatic or aromatic dicarbamic acid having from 8 to 14 C-atoms, where the dicarboxylic acid may be substituted in the aliphatic, cycloaliphatic or aromatic part by 1 or 2 —COOZ$^1$ groups, where Z$^1$ is as defined above; or when n=3, G is the trivalent acid radical of an aliphatic, cycloaliphatic or aromatic tricarboxylic acid, where the radical may be substituted in the aliphatic, cycloaliphatic or aromatic part by —COOZ$^1$, where Z$^1$ is as defined above, or the trivalent acid radical of an aromatic tricarbamic acid or a phosphorus-containing acid, or a trivalent silyl radical; and when n=4, G is the tetravalent acid radical of an aliphatic, cycloaliphatic or aromatic tetracarboxylic acid.

For example, the present hindered hydroxylamine esters are of formula (IA) where n is 1 or 2, $R_1$', $R_2$' and $R_3$' are each hydrogen and $R_a$ is $C_2$-$C_{18}$alkanoyl or $C_3$-$C_6$alkenoyl and G is the acyl radical of an aliphatic monocarboxylic acid having from 12 to 18 C-atoms or the diacyl radical of an aliphatic dicarboxylic acid having from 4 to 12 C-atoms.

G defined as $C_1$-$C_{18}$alkyl may be as defined below or may for example be n-tridecyl, n-tetradecyl, n-hexadecyl or n-octadecyl.

A monovalent acyl radical of a carboxylic acid as G may be, for example, the acyl radical of acetic acid, hexanoic acid, stearic acid, acrylic acid, methacrylic acid, benzoic acid or β-(3,5-di-tert-butyl-4-hydroxyphenyl)propionic acid; preferably the acyl radical of stearic acid, acrylic acid or methacrylic acid.

A monovalent silyl radical G may be, for example, a radical —($C_nH_{2n}$)—Si(Z')$_2$Z'', where n is an integer from 2 to 5 and Z' and Z'' are each, independently of one another $C_1$-$C_4$alkyl or $C_1$-$C_4$alkoxy.

A divalent acid radical of a dicarboxylic acid as G may be, for example, the acid radical of malonic acid, succinic acid, glutaric acid, adipic acid, suberic acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid.

A trivalent radical of a tricarboxylic acid as G may be, for example, the acid radical of trimellitic acid, citric acid or nitrilotriacetic acid.

A tetravalent radical of a tetracarboxylic acid as G may be, for example, the tetravalent acid radical of butane-1,2,3,4-tetracarboxylic acid or of pyromellitic acid.

A divalent radical of a dicarbamic acid as G may be, for example, the hexamethylenedicarbamic acid radical or the 2,4-toluoylenedicarbamic acid radical.

Preferred compounds are compounds (IA), in which n is 1 or 2, $R_1$', $R_2$' and $R_a$' are each hydrogen and $R_a$ is $C_2$-$C_{18}$alkanoyl or $C_3$-$C_6$alkenoyl and G is the acyl radical of an aliphatic monocarboxylic acid having from 12 to 18 C-atoms or the diacyl radical of an aliphatic dicarboxylic acid having from 4 to 12 C-atoms.

The hydroxylamine esters may be of the formula IB

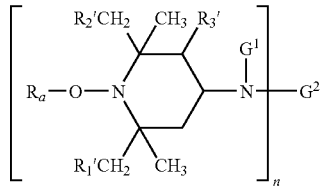

(IB)

where n is 1 or 2 and $R_a$, $R_1$', $R_2$' and $R_3$' are as defined under the formula IA;

G$^1$ is hydrogen, $C_1$-$C_{12}$alkyl, $C_2$-$C_5$hydroxyalkyl, $C_6$-$C_7$cycloalkyl, $C_7$-$C_8$aralkyl, $C_2$-$C_{18}$alkanoyl, $C_3$-$C_5$alkenoyl or benzoyl or a group:

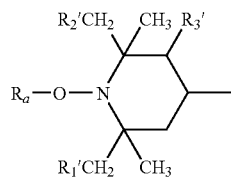

where $R_a$, $R_1$', $R_2$' and $R_3$' are as defined above; and

G$^2$ has the following meanings:

when n=1,

G$^2$ is hydrogen, $C_1$-$C_{18}$alkyl, $C_3$-$C_8$alkenyl, $C_5$-$C_7$cycloalkyl, $C_1$-$C_4$alkyl which bears a hydroxy, cyano, alkoxycarbonyl or carbamido group as substituent, glycidyl or a group —$CH_2$—CH(OH)—Z or CONH—Z, where Z is hydrogen, methyl or phenyl; or when n=2, G$^2$ is $C_2$-$C_{12}$alkylene, $C_6$-$C_{12}$arylene, xylylene or —$CH_2$CH(OH)—$CH_2$— or —$CH_2$—CH(OH)—$CH_2$—O-D-O— group, where D is $C_2$-$C_{10}$alkylene, $C_6$-$C_{15}$arylene, $C_6$-$C_{12}$cyclo-alkylene;

or, provided that G$^1$ is not alkanoyl, alkenoyl or benzoyl, G$^2$ may also be 1-oxo-$C_2$-$C_{12}$alkylene, the divalent radical of an aliphatic, cycloaliphatic or aromatic dicarboxylic acid or dicarbamic acid or the —CO— group;

or, when n=1, G$^1$ and G$^2$ may together be the divalent radical of an aliphatic, cycloaliphatic or aromatic 1,2-dicarboxylic acid or 1,3-dicarboxylic acid.

$C_1$-$C_{12}$Alkyl and $C_1$-$C_{18}$alkyl substituents are as defined above under the formula (IA).

$C_6$-$C_7$Cycloalkyl is preferably cyclohexyl.

A $C_7$-$C_8$aralkyl group G$^1$ is preferably 2-phenylethyl or benzyl.

A $C_2$-$C_5$hydroxyalkyl group G$^1$ is preferably 2-hydroxyethyl or 2- or 3-hydroxypropyl. A $C_2$-$C_{18}$alkanoyl group G$^1$ may be, for example, propionyl, butyryl, octanoyl, dodecanoyl, hexadecanoyl, octadecanoyl, preferably acetyl.

A $C_3$-$C_5$alkenoyl group G$^1$ is preferably acryloyl.

A $C_2$-$C_8$alkenyl group G$^2$ may be, for example, allyl, methallyl, 2-butenyl, 2-pentenyl, 2-hexenyl or 2-octenyl.

A hydroxy-, cyano-, alkoxycarbonyl- or carbamido-substituted $C_1$-$C_4$alkyl group G$^2$ may be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

A $C_2$-$C_{12}$alkylene group G$^2$ may be, for example, ethylene, propylene, 2,2-dimethylpropylene, tetramethylene, hexamethylene, octamethylene, decamethylene or dodecamethylene.

A $C_6$-$C_{15}$arylene group G$^2$ may be, for example, o-, m- or p-phenylene, 1,4-naphthylene or 4,4'-biphenylene.

A $C_6$-$C_{12}$-cycloalkylene group G$^2$ is preferably cyclohexylene.

For instance, the present hydroxylamine esters are of the formula IC $$\begin{bmatrix} R_a-O-N \underset{R_1'CH_2\ \ CH_3}{\overset{R_2'CH_2\ \ CH_3\ R_3'}{\diagup}} \underset{O}{\overset{O}{\diagdown}} G^3 \end{bmatrix}_n \quad (IC)$$

where n is 1 or 2 and $R_a$, $R_1'$, $R_2'$ and $R_3'$ are as defined under the formula IA; and $G^3$ is $C_2$-$C_8$alkylene, $C_2$-$C_8$hydroxyalkylene or $C_4$-$C_{24}$acyloxyalkylene when n=1 or is the group $(-CH_2)_2C(CH_2-)_2$ when n=2.

For example, the present hydroxylamine esters are of the formula IC where $R_a$, $R_1'$, $R_2'$ and $R_3'$ are as defined under the formula IA and $G^3$ is $C_2$-$C_8$alkylene or $C_4$-$C_{24}$acyloxyalkylene.

A $C_2$-$C_8$alkylene or $C_2$-$C_8$hydroxyalkylene group $G^3$ may be, for example, ethylene, 1-methylethylene, propylene, 2-ethylpropylene or 2-ethyl-2-hydroxymethylpropylene.

A $C_4$-$C_{22}$-acyloxyalkylene group $G^3$ may be, for example, 2-ethyl-2-acetoxymethyl-propylene.

The hydroxylamine esters may be of the formulae ID, IE or IF $$(ID)$$

$$(IE)$$

$$(IF)$$

where n is 1 or 2 and $R_a$, $R_1'$, $R_2'$ and $R_3'$ are as defined under the formula IA; and $G^4$ is hydrogen, $C_1$-$C_{12}$alkyl, allyl, benzyl, glycidyl or $C_2$-$C_6$alkoxyalkyl; and $G^5$ has the following meanings:

when n=1, $G^5$ is hydrogen, $C_1$-$C_{12}$alkyl, $C_3$-$C_5$alkenyl, $C_7$-$C_9$aralkyl, $C_6$-$C_7$cycloalkyl, $C_2$-$C_4$hydroxyalkyl, $C_2$-$C_6$alkoxyalkyl, $C_6$-$C_{10}$aryl, glycidyl or a group: $-(CH_2)_p-COO-Q$ or $-(CH_2)_p-O-CO-Q$, where p is 1 or 2 and Q is $C_1$-$C_4$alkyl or phenyl; or when n=2, $G^5$ is $C_2$-$C_{12}$alkylene, $C_4$-$C_{12}$alkenylene, $C_6$-$C_{12}$arylene, the group $-CH_2-CH(OH)-CH_2-O-D-O-CH_2-CH(OH)-CH_2-$, where D is $C_2$-$C_{10}$-alkylene, $C_6$-$C_{15}$arylene or $C_6$-$C_{12}$-cycloalkylene, or the group $-CH_2CH(OZ')CH_2-(OCH_2-CH(OZ')CH_2)_2-$, where $Z'$ is hydrogen, $C_1$-$C_{18}$alkyl, allyl, benzyl, $C_2$-$C_{12}$-alkanoyl or benzoyl;

$T^1$ and $T^2$ are each, independently of one another, hydrogen, $C_1$-$C_{18}$alkyl, $C_6$-$C_{10}$aryl or $C_7$-$C_9$aralkyl, each of which may be substituted by halogen or $C_1$-$C_4$-alkyl, or $T^1$ and $T^2$ together with the carbon atom connecting them form a $C_5$-$C_{14}$cycloalkane ring.

The substituents $C_1$-$C_{12}$alkyl are, for example, methyl, ethyl, n-propyl, isopropyl, n-butyl, sec-butyl, tert-butyl, n-hexyl, n-octyl, 2-ethylhexyl, n-nonyl, n-decyl, n-undecyl or n-dodecyl.

Substituents defined as $C_1$-$C_{18}$-alkyl may be, for example, the above-mentioned groups or, for example, n-tridecyl, n-tetradecyl, n-hexadecyl or n-octadecyl, $C_2$-$C_6$Alkoxyalkyl is, for example, methoxymethyl, ethoxymethyl, propoxymethyl, tert-butoxymethyl, 2-ethoxyethyl, 2- or 3-ethoxy-n-propyl, 2-n-butoxyethyl, 2-tert-butoxyethyl, 2-isopropoxyethyl or 2- or 3-n-propoxy-n-propyl.

A $C_3$-$C_5$alkenyl group $G^5$ may be, for example, 1-propenyl, allyl, methallyl, 2-butenyl or 2-pentenyl.

$C_7$-$C_9$Aralkyl groups $G^5$, $T^1$ and $T^2$ are preferably 2-phenethyl or benzyl. When $T^1$ and $T^2$ together with the carbon atom form a cycloalkane ring, this ring may be, for example, a cyclopentane, cyclohexane, cyclooctane or cyclododecane ring.

A $C_2$-$C_4$hydroxyalkyl group $G^5$ may be, for example, 2-hydroxyethyl, 2- or 3-hydroxy-n-propyl or 2-, 3- or 4-hydroxy-n-butyl.

A $C_6$-$C_{10}$aryl group $G^5$, $T^1$ and $T^2$ is preferably phenyl or α- or β-naphthyl, each of which may be substituted by halogen or $C_1$-$C_4$alkyl.

A $C_2$-$C_{12}$alkylene group $G^6$ may be, for example, ethylene, propylene, 2,2-dimethylpropylene, tetramethylene, hexamethylene, octamethylene, decamethylene or dodecamethylene.

A $C_4$-$C_{12}$alkenylene group $G^5$ is preferably 2-butenylene, 2-pentenylene or 3-hexenylene. A $C_6$-$C_{12}$arylene group $G^5$ may be, for example, o-, m- or p-phenylene, 1,4-naphthylene or 4,4'-biphenylene.

A $C_{2-12}$alkanoyl group $Z'$ is, for example, preferably acetyl and may also be propionyl, butyryl, n-octanoyl or n-dodecanoyl.

$C_2$-$C_{10}$Alkylene, $C_6$-$C_{15}$arylene and $C_6$-$C_{12}$cycloalkylene groups D are as defined under formula IB.

The present hindered hydroxylamine esters may be of the formula IG $$(IG)$$

where
n=1 or 2 and $G^6$ is a group:

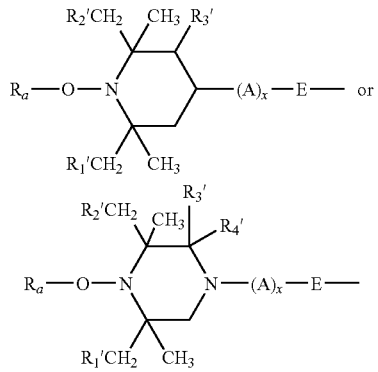

where $R_a$, $R_1'$, $R_2'$ and $R_3'$ are as defined under the formula IA, and $R_3'$ and $R_4'$ are each hydrogen or methyl or together form the substituent =O;
E is —O— or —NG$^1$-,
A is $C_2$-$C_6$-alkylene or —(CH$_2$)$_3$—O—, and x is either 0 or 1;
$G^1$ is hydrogen, $C_1$-$C_{12}$alkyl, $C_2$-$C_5$hydroxyalkyl or $C_5$-$C_7$cycloalkyl;
$G^7$ is identical to $G^6$ or is one of the groups —NG$^9$G$^{10}$, —OG$^{11}$, —NHCH$_2$OG$^{11}$ or —N(CH$_2$OG$^{11}$)$_2$;
when n=1, $G^8$ is identical to $G^6$ or $G^7$; and,
when n=2, $G^8$ is the group -E-B-E-, where B is $C_2$-$C_8$-alkylene or $C_2$-$C_8$-alkylene interrupted by 1 or 2 —NG$^9$- groups, and $G^9$ is $C_1$-$C_{12}$alkyl, cyclohexyl, benzyl or $C_1$-$C_4$hydroxyalkyl or the groups:

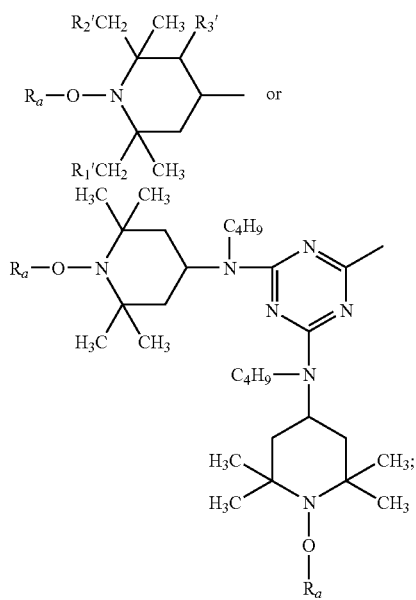

$G^{10}$ is $C_1$-$C_{12}$-alkyl, cyclohexyl, benzyl or $C_1$-$C_4$-hydroxyalkyl, and $G^{11}$ is hydrogen, $C_1$-$C_{12}$-alkyl or phenyl; and
$G^9$ and $G^{10}$ are together $C_4$-$C_5$-alkylene or $C_4$-$C_5$oxaalkylene.
$G^9$ and $G^{10}$ may further be together, for example, $C_4$-$C_5$-alkylene, $C_4$-$C_5$oxaalkylene, e.g. tetramethylene, pentamethylene or 3-oxapentamethylene, or the corresponding $C_4$-$C_5$thiaalkylene, e.g. the group

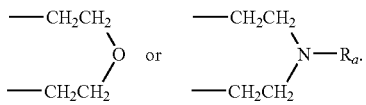

$C_1$-$C_{12}$Alkyl is, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.
$C_1$-$C_4$Hydroxyalkyl is, for example, 2-hydroxyethyl, 2- or 3-hydroxypropyl or 2-, 3- or 4-hydroxy-n-butyl.
A $C_2$-$C_6$alkylene group A, may be, for example, ethylene, propylene, 2,2-dimethylpropylene, tetramethylene or hexamethylene.

The hindered hydroxylamine ester compounds may be of the formula IH

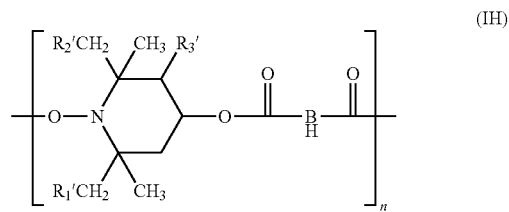

where n is an integer greater than two and $R_1'$, $R_2'$ and $R_3'$ are as defined under the formula IA; and B is a bivalent substituent.

B is for example $C_1$-$C_{12}$alkylene, e.g. methylene, ethylene, propylene, 2,2-dimethylpropylene or tetramethylene, hexamethylene, octamethylene, decamethylene or dodecamethylene, $C_6$-$C_{15}$arylene, e.g. a group:

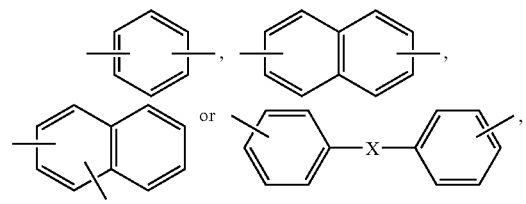

where X is a bivalent substituent, e.g. $C_1$-$C_{12}$alkylene as defined above, —O—, —(C=O)—, —S— or —S(=O)$_2$—.
The present polyesters of formula (IH) may also be where the group

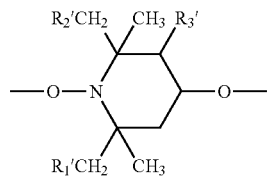

is partially replaced by suitable dials, which are derived, for example, from aliphatic, cycloaliphatic or aromatic dials.
The aliphatic diols may contain from 2 to 12 C-atoms, the cycloaliphatic diols may contain from 5 to 8 C-atoms and the aromatic dials may contain from 6 to 15 C-atoms. Polyoxyalkylene glycols having molecular weights in the range from 150 to 40 000 are also possible.

Aromatic dials are compounds in which two hydroxy groups are bound to an aromatic hydrocarbon radical or to different aromatic hydrocarbon radicals.

It is also possible for the polyesters to be branched by means of small amounts, e.g. from 0.1 to 3 mol %, based on the dicarboxylic acids present, of more than bifunctional monomers (e.g. pentaerythritol, trimellitic acid, 1,3,5-tri(hydroxyphenyl)benzene, 2,4-dihydroxybenzoic acid or 2-(4-hydroxyphenyl)-2-(2,4-dihydroxyphenyl)propane).

Suitable aliphatic dials are linear and branched aliphatic glycols, in particular those having from 2 to 12, preferably from 2 to 6, C-atoms in the molecule, e.g. ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol.

A suitable cycloaliphatic diol is, for example, 1,4-dihydroxycyclohexane. Further suitable diols are, for example, 1,4-bis(hydroxymethyl)cyclohexane, aromatic-aliphatic diols such as p-xylylene glycol or 2,5-dichloro-p-xylylene glycol, 2,2-(β-hydroxyethoxyphenyl)propane and also polyoxyalkylene glycols such as diethylene glycol, triethylene glycol, polyethylene glycol or polypropylene glycol. The alkylenediols are preferably linear and contain, in particular, from 2 to 4 C-atoms.

Preferred dials are alkylene dials, 1,4-dihydroxycyclohexane and 1,4-bis(hydroxymethyl)cyclohexane. Particular preference is given to ethylene glycol, 1,4-butanediol and 1,2- and 1,3-propylene glycol.

Further suitable aliphatic diols are the β-hydroxyalkylated, in particular β-hydroxyethylated, bisphenols such as 2,2-bis[4'-(β-hydroxyethoxy)phenyl]propane.

A further group of suitable aliphatic diols consists of the heterocyclic diols described in U.S. Pat. Nos. 3,867,400 and 3,954,790. Examples are: N,N'-bis(β-hydroxyethyl)-5,5-dimethylhydantoin, N,N'-bis(β-hydroxypropyl)-5,5-dimethylhydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethyl) benzimidazolone, N,N'-bis(β-hydroxyethyl)(tetrachloro) benzimidazolone or N,N'-bis(β-hydroxyethyl)(tetrabromo) benzimidazolone.

Suitable aromatic diols are diphenols having one aromatic unit, in particular diols having two aromatic units which bear a hydroxy group on each aromatic unit. Aromatic units are to be Understood as meaning aromatic hydrocarbon radicals such as phenylene or naphthylene. Apart from, for example, hydroquinone, resorcinol or 1,5-, 2,6- and 2,7-dihydroxynaphthalene, particular mention may be made of the bisphenols bis(p-hydroxyphenyl)ether or thioether, bis(p-hydroxyphenyl)sulfone, bis(p-hydroxyphenyl)methane, 2,2'-bis(4-hydroxyphenyl)biphenyl, phenylhydroquinone, 1,2-bis(p-hydroxyphenyl)ethane, 1-phenylbis(p-hydroxyphenyl)methane, diphenylbis(p-hydroxyphenyl)methane, diphenylbis(p-hydroxyphenyl)ethane, bis(3,5-dimethyl-4-hydroxyphenyl) sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- or 2,2-bis(p-hydroxyphenyl) butane, 2,2-bis(p-hydroxyphenyl)hexafluoropropane, 1,1-dichloro- or 1,1,1-trichloro-2,2-bis(p-hydroxyphenyl) ethane, 1,1-bis(p-hydroxyphenyl)cyclopentane and in particular 2,2-bis(p-hydroxyphenyl)propane (bisphenol A) and 1,1-bis(p-hydroxyphenyl)cyclohexane (bisphenol C).

Examples of substituted or unsubstituted alkylene are methylene, ethylene, phenylmethylene, diphenylmethylene and methylphenylmethylene.

Examples of cycloalkylidene are cyclopentylidene, cyclohexylidene, cycloheptylidene and cyclooctylidene.

$C_6$-$C_{10}$ aryl is for example phenyl or naphthyl, but also comprised are $C_1$-$C_4$alkyl substituted phenyl. Examples for alkyl substituted phenyl are ethylbenzene, toluene, xylene and its isomers, mesitylene or isopropylbenzene.

Alkyl is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl.

The addition of the hydroxylamine esters to the thermoplastic polymer can be carried out in all customary mixing machines in which the polymer is melted and mixed with the additives.

Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in Handbuch der Kunststoffextrusion, Vol. 1 Grundlagen, Editors F. Hensen, W. Knappe, H. Potente, 1989, pp. 3-7, ISBN:3-446-14339-4 (Vol. 2 Extrusionsanlagen 1986, ISBN 3-446-14329-7). For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The polymers need to be subjected to an elevated temperature for a sufficient period of time during incorporation of additives. The temperature is generally above the softening point of the polymers.

In a preferred embodiment of the process of the present invention, a temperature range lower than 280° C., particularly from about 160° C. to 280° C. is employed. In a particularly preferred process variant, the temperature range from about 200° C. to 270° C. is employed.

The above-described hydroxylamine esters are suitable for reducing the molecular weight of polypropylene, propylene copolymers and polypropylene blends during compounding, where they effect degradation of the polymer chains. Provided are for example very uniform polypropylene polymers with a narrow molecular weight distribution. Such polypropylene is excellent for electret applications.

Incorporation can, alternatively, also be carried out at temperatures which do not yet cause decomposition of the polymers (latent compound). The polymers prepared in this way can subsequently be heated a second time and subjected to an elevated temperature for a sufficient period of time so that the desired polymer degradation occurs.

In the processes and compositions of the present invention the above-described hydroxylamine ester containing compounds are present in concentrations, based on the amount of the polymer, of from about 0.001 to 5.0% by weight, in particular from 0.01 to 2.0% by weight and particularly preferably from 0.02 to 1.0% by weight. The hydroxylamine esters can be added as individual compounds or as mixtures to the polymer.

Incorporation of additives into the polymers can be carried out, for example, by mixing the above-described hydroxylamine esters or mixtures thereof and, if desired, further additives into the polymers using the methods customary in process technology.

The hydroxylamine esters can also be added to the polymers in the form of a masterbatch in which these compounds are present, for example, in a concentration of from about 1 to 25% by weight. The present invention therefore further provides a concentrate in which the compounds of the invention are present in a concentration of 1-25% by weight and which can be added to the thermoplastic polymer.

Another aspect of this invention is the co-use of certain other additives along with the present hydroxylamine esters. These certain other additives are incorporated in the same manner as the hydroxylamine esters.

For instance, the class of stabilizers of the hindered amine light stabilizers (HALS) other than the present hydroxylamine ester compounds are advantageously also employed in the present processes and compositions.

The present sterically hindered amine stabilizers contain at least one moiety of formula

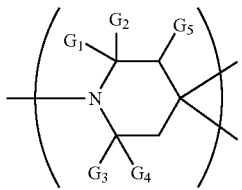

where $G_1$, $G_2$, $G_3$, $G_4$ and $G_5$ are independently alkyl of 1 to 8 carbon atoms or $G_1$ and $G_2$ or $G_3$ and $G_4$ together are pentamethylene.

The hindered amines are disclosed for example in U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584 and 6,472,456, and U.S. application Ser. No. 09/714,717, filed Nov. 16, 2000 and Ser. No. 10/485,377, filed Aug. 6, 2002. The relevant disclosures of these patents and applications are hereby incorporated by reference.

U.S. Pat. Nos. 6,271,377, 6,392,041 and 6,376,584, cited above disclose hindered hydroxyalkoxyamine stabilizers.

Suitable hindered amines include for example:
1) 1-cyclohexyloxy-2,2,6,6-tetramethyl-4-octadecylaminopiperidine,
2) bis(2,2,6,6-tetramethylpiperidin-4-yl)sebacate,
3) bis(1-acetoxy-2,2,6,6-tetramethylpiperidin-4-yl)sebacate,
4) bis(1,2,2,6,6-pentamethyl-4-yl)sebacate,
5) bis(1-cyclohexyloxy-2,2,6,6-tetramethylpiperidin-4-yl) sebacate,
6) bis(1-octyloxy-2,2,6,6-tetrannethylpiperidin-4-yl)sebacate;
7) bis(1-acyl-2,2,6,6-tetramethylpiperidin-4-yl)sebacate,
8) bis(1,2,2,6,6-pentamethyl-4-piperidyl)n-butyl-3,5-di-tert-butyl-4-hydroxybenzylmalonate
9) 2,4-bis[(1-cyclohexyloxy-2,2,6,6-tetramethylpiperidin-4-yl)butylamino]-6-(2-hydroxyethylamino-s-triazine,
10) bis(1-cyclohexyloxy-2,2,6,6-tetramethylpiperidin-4-yl) adipate,
11) 2,4-bis[1-cyclohexyloxy-2,2,6,6-piperidin-4-yl)butylamino]-6-chloro-s-triazine,
12) 1-(2-hydroxy-2-methylpropoxy)-4-hydroxy-2,2,6,6-tetramethylpiperidine,
13) 1-(2-hydroxy-2-methylpropoxy)-4-oxo-2,2,6,6-tetramethylpiperidine,
14) 1-(2-hydroxy-2-methylpropoxy)-4-octadecanoyloxy-2,2,6,6-tetramethylpiperidine,
15) bis(1-(2-hydroxy-2-methylpropoxy)-2,2,6,6-tetramethylpiperidin-4-yl)sebacate,
16) bis(1-(2-hydroxy-2-methylpropoxy)-2,2,6,6-tetramethylpiperidin-4-yl)adipate,
17) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine,
18) 4-benzoyl-2,2,6,6-tetramethylpiperidine,
19) di-(1,2,2,6,6-pentamethylpiperidin-4-yl)p-methoxybenzylidenemalonate,
20) 4-stearyloxy-2,2,6,6-tetramethylpiperidine,
21) bis(1-octyloxy-2,2,6,6-tetramethylpiperidyl)succinate,
22) 1,2,2,6,6-pentamethyl-4-aminopiperidine,
23) 2-undecyl-7,7,9,9-tetramethyl-1-oxa-3,8-diaza-4-oxospiro[4,5]decane,
24) tris(2,2,6,6-tetramethyl-4-piperidyl)nitrilotriacetate,
25) tris(2-hydroxy-3-(amino-(2,2,6,6-tetramethylpiperidin-4-yl)propyl)nitrilotriacetate,
26) tetrakis(2,2,6,6-tetramethyl-4-piperidyl)-1,2,3,4-butane-tetracarboxylate,
27) tetrakis(1,2,2,6,6-pentamethyl-4-piperidyl)-1,2,3,4-butane-tetracarboxylate,
28) 1,1'-(1,2-ethanediyl)-bis(3,3,5,5-tetramethylpiperazinone),
29) 3-n-octyl-7,7,9,9-tetramethyl-1,3,8-triazaspiro[4.5]decan-2,4-dione,
30) 8-acetyl-3-dodecyl-7,7,9,9-tetramethyl-1,3,8-triazaspiro[4.5]decane-2,4-dione,
31) 3-dodecyl-1-(2,2,6,6-tetramethyl-4-piperidyl)pyrrolidin-2,5-dione,
32) 3-dodecyl-1-(1,2,2,6,6-pentamethyl-4-piperidyl)pyrrolidine-2,5-dione,
33) N,N'-bis-formyl-N,N'-bis(2,2,6,6-tetramethyl-4-piperidyl)hexamethylenediamine,
34) the reaction product of 2,4-bis[(1-cyclohexyloxy-2,2,6,6-piperidin-4-yl)butylamino]-6-chloro-s-triazine with N,N'-bis(3-aminopropyl)ethylenediamine),
35) the condensate of 1-(2-hydroxyethyl)-2,2,6,6-tetramethyl-4-hydroxypiperidine and succinic acid,
36) linear or cyclic condensates of N,N'-bis(2,2,6,6-tetramethyl-4-piperidyl)-hexamethylenediamine and 4-tert-octylamino-2,6-dichloro-1,3,5-triazine,
37) linear or cyclic condensates of N,N'-bis(2,2,6,6-tetramethyl-4-piperidyl)-hexamethylenediamine and 4-cyclohexylamino-2,6-dichloro-1,3,5-triazine,
38) linear or cyclic condensates of N,N'-bis-(2,2,6,6-tetramethyl-4-piperidyl)-hexamethylenediamine and 4-morpholino-2,6-dichloro-1,3,5-triazine,
39) linear or cyclic condensates of N,N'-bis-(1,2,2,6,6-pentamethyl-4-piperidyl)-hexamethylenediamine and 4-morpholino-2,6-dichloro-1,3,5-triazine, 40) the condensate of 2-chloro-4,6-bis(4-n-butylamino-2,2,6,6-tetramethylpiperidyl)-1,3,5-triazine and 1,2-bis(3-aminopropylamino)ethane,
41) the condensate of 2-chloro-4,6-di-(4-n-butylamino-1,2,2,6,6-pentamethylpiperidyl)-1,3,5-triazine and 1,2-bis-(3-aminopropylamino)ethane,
42) a reaction product of 7,7,9,9-tetramethyl-2-cycloundecyl-1-oxa-3,8-diaza-4-oxospiro[4,5]decane and epichlorohydrin,
43) poly[methyl, (3-oxy-(2,2,6,6-tetramethylpiperidin-4-yl)propyl)]siloxane, CAS#182635-99-0,
44) reaction product of maleic acid anhydride-$C_{18}$-$C_{22}$-α-olefin-copolymer with 2,2,6,6-tetramethyl-4-aminopiperidine,
45) the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,
46) the oligomeric compound which is the condensation product of 4,4'-hexamethylene-bis(amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine,
47) the oligomeric compound which is the condensation product of 4,4'-hexamethylene-bis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine,
48) the oligomeric compound which is the condensation product of 4,4'-hexamethylene-bis(amino-1-acyloxy-2,2,6,6-tetramethylpiperidine) and 2,4-dichloro-6-[(1-acyloxy-2,2,6,6-tetra-methylpiperidin-4-yl)butylamino]-s-triazine end-capped with 2-chloro-4,6-bis(dibutylamino)-s-triazine and
49) product obtained by reacting a product, obtained by reacting 1,2-bis(3-amino-propylamino)ethane with cyanuric chloride, with (2,2,6,6-tetramethylpiperidin-4-yl)butylamine.

Also included are the sterically hindered N—H, N-methyl, N-methoxy, N-propoxy, N-octyloxy, N-cyclohexyloxy and N-(2-hydroxy-2-methylpropoxy) analogues of any of the above mentioned compounds. For example, replacing an N—H hindered amine with an N-methyl hindered amine would be employing the N-methyl analogue in place of the N—H.

The class of additives known as the hydroxyphenylalkylphosphonic esters or monoesters are also advantageously employed in the processes and compositions of this invention. The hydroxyphenylalkylphosphonic esters or monoesters are disclosed for example in U.S. published app. No. 2004/0106767, the disclosure of which is hereby incorporated by reference. The hydroxyphenylalkylphosphonic esters or monoesters are of the formula

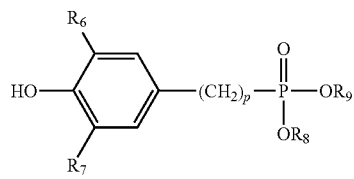

wherein
$R_6$ is isopropyl, tert-butyl, cyclohexyl or cyclohexyl which is substituted by 1-3 $C_1$-$C_4$alkyl groups,
$R_7$ is hydrogen, $C_1$-$C_4$alkyl, cyclohexyl or cyclohexyl which is substituted by 1-3 $C_1$-$C_4$alkyl groups,
$R_8$ is $C_1$-$C_{20}$alkyl, unsubstituted or $C_1$-$C_4$alkyl-substituted phenyl or naphthyl,
$R_9$ is hydrogen, $C_1$-$C_{20}$alkyl, unsubstituted or $C_1$-$C_4$alkyl-substituted phenyl or naphthyl; or is $$\frac{M^{r+}}{r};$$

$M^{r+}$ is an r-valent metal cation,
p is 1, 2, 3, 4, 5 or 6, and
r is 1, 2 or 3.

For example, the present hydroxyphenylalkylphosphonic ester or monoester is a compound of the formula P1 or P2

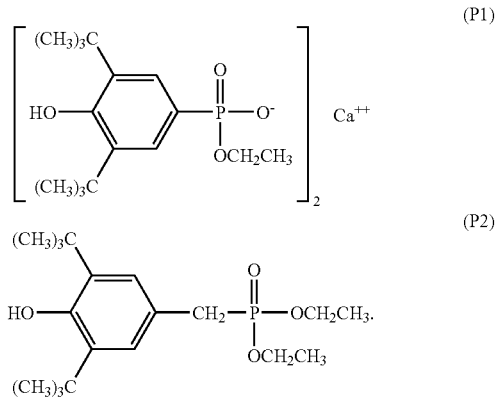

The processes and compositions of the present invention may further include additives from the class of the aromatic trisamide nucleating agents. The trisamide nucleating agents are taught for example in published U.S. app. No. 2005/0203226 and U.S. application Ser. No. 10/544,508, filed Feb. 9, 2004, published as WO 2004/072168, the contents of which are hereby incorporated by reference.

The aromatic trisamides are for instance of the formula

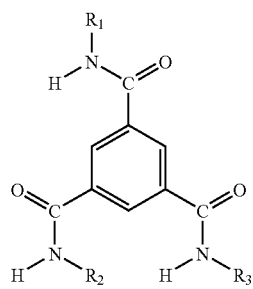

wherein
$R_1$, $R_2$ and $R_3$, independently of one another, are
$C_1$-$C_{20}$alkyl
$C_2$-$C_{20}$alkyl substituted by $C_1$-$C_{10}$alkylamino, di($C_1$-$C_{10}$alkyl)amino, $C_1$-$C_{10}$alkyloxy or hydroxy;
$C_3$-$C_{20}$alkenyl,
$C_5$-$C_{12}$cycloalkyl,
$C_5$-$C_{12}$cycloalkyl substituted by 1, 2 or 3 $C_1$-$C_{10}$alkyl;

cyclohexylmethyl;
cyclohexylmethyl substituted by 1, 2 or 3 $C_1$-$C_{10}$alkyl;
$C_5$-$C_9$cycloalkenyl,
$C_5$-$C_9$cycloalkenyl substituted by 1, 2 or 3 $C_1$-$C_{10}$alkyl;
phenyl substituted by 1, 2 or 3 radicals selected from the group consisting of $C_1$-$C_{10}$alkyl, $C_1$-$C_{10}$alkyloxy, hydroxy, halogen, trihalogenmethyl, trihalogenmethoxy, benzoyl, phenylamino, acylamino and phenylazo;
$C_7$-$C_9$-phenylalkyl,
$C_7$-$C_9$-phenylalkyl which is substituted on the phenyl by 1, 2 or 3 radicals selected from the group consisting of $C_1$-$C_{10}$alkyl, $C_1$-$C_{10}$alkoxy and hydroxy;
naphthyl,
naphthyl substituted by $C_1$-$C_{10}$alkyl;
adamantyl, or
a 5 to 6 membered heterocyclic group.

The aromatic trisamides are for example of the formulae

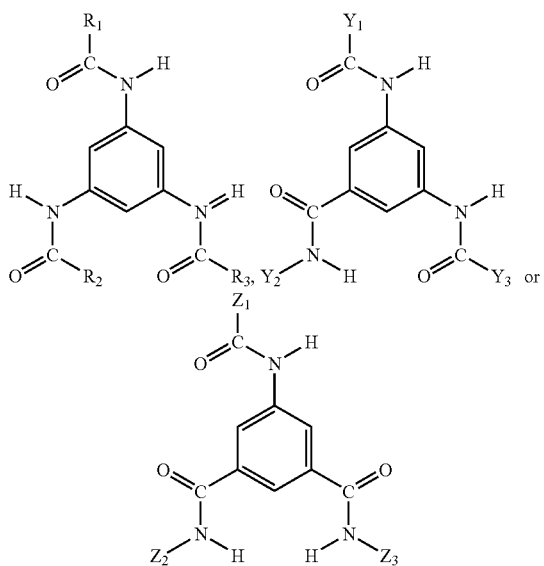

wherein
$R_1$, $R_2$ and $R_3$, or $Y_1$, $Y_2$ and $Y_3$, or $Z_1$, $Z_2$ and $Z_3$ independently of one another are
$C_1$-$C_{20}$alkyl unsubstituted or substituted by one or more hydroxy;
$C_2$-$C_{20}$alkenyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-$C_1$-$C_{10}$alkyl unsubstituted or substituted by one or more $C_1$-$C_{20}$alkyl;
bis[$C_3$-$C_{12}$cycloalkyl]-$C_1$-$C_{10}$alkyl unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
phenylethenyl unsubstituted or substituted by one or more $C_1$-$C_{20}$alkyl;
biphenyl-($C_1$-$C_{10}$alkyl) unsubstituted or substituted by one or more $C_1$-$C_{20}$alkyl;
naphthyl unsubstituted or substituted by one or more $C_1$-$C_{20}$alkyl;
naphthyl-$C_1$-$C_{20}$alkyl unsubstituted or substituted by one or more $C_1$-$C_{20}$alkyl;
naphthoxymethyl unsubstituted or substituted by one or more $C_1$-$C_{20}$alkyl;
biphenylenyl, flourenyl, anthryl;
a 5- to 6-membered heterocyclic radical unsubstituted or substituted by one or more $C_1$-$C_{20}$alkyl;
a $C_1$-$C_{20}$hydrocarbon radical containing one or more halogen; or
tri($C_1$-$C_{10}$alkyl)silyl($C_1$-$C_{10}$alkyl);
with the proviso that at least one of the radicals $R_1$, $R_2$ and $R_3$, or $Y_1$, $Y_2$ and $Y_3$, or $Z_1$, $Z_2$ and $Z_3$ is
branched $C_3$-$C_{20}$alkyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-$C_1$-$C_{10}$alkyl unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
biphenyl-($C_1$-$C_{10}$alkyl) unsubstituted or substituted by one or more $C_1$-$C_{20}$alkyl;
naphthyl-$C_1$-$C_{20}$alkyl unsubstituted or substituted by one or more $C_1$-$C_{20}$alkyl; or According to a preferred embodiment,
at least one of the radicals $R_1$, $R_2$ and $R_3$, or $Y_1$, $Y_2$ and $Y_3$, or $Z_1$, $Z_2$ and $Z_3$ is branched $C_3$-$C_{20}$alkyl, or
$C_3$-$C_{12}$cycloalkyl unsubstituted or substituted by one or more $C_1$-$C_{20}$alkyl.

According to a particular preferred embodiment,
at least one of the radicals $R_1$, $R_2$ and $R_3$, or $Y_1$, $Y_2$ and $Y_3$, or $Z_1$, $Z_2$ and $Z_3$ is branched $C_3$-$C_{10}$alkyl.

The further additives of the hindered amine light stabilizers, the hydroxyphenylalkylphosphonic esters or monoesters and the aromatic trisamide nucleating agents are employed at the same levels as the present hydroxylamine esters.

The following Examples further illustrate the present invention. All percentages are in weight percent unless otherwise indicated.

EXAMPLE 1

The following hindered hydroxylamine ester compounds are prepared according to published U.S. app. No. 2003/0216494.

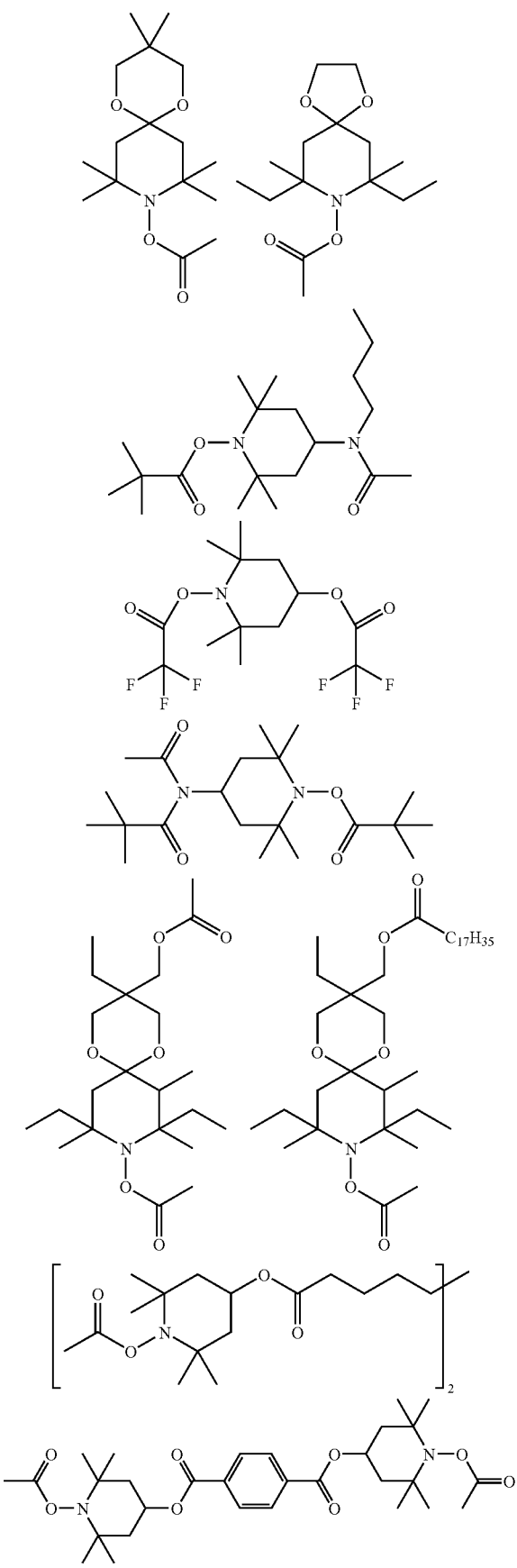

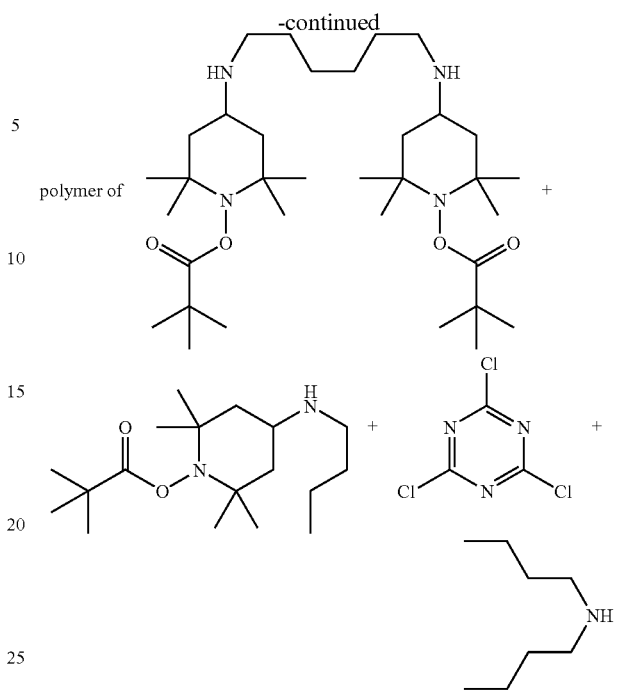

The above hydroxylamine ester compounds are individually melt compounded in polypropylene at a level of 0.05 weight percent. 0.1 parts by weight of calcium stearate is also incorporated into the polypropylene. The resultant granules are spun by means of a melt-blown method to obtain nonwoven fabrics.

The fabrics are subjected to a corona treatment.

The nonwoven fabrics exhibit excellent thermal stability. The fabrics also hold the electric charge for a long period of time, that is the fabrics have good charge stability.

EXAMPLE 2

Polypropylene with melt flow index (MFI) of 35, 25, or 12 are tumble mixed to contain 5.0% by weight of a sterically hindered amine (HALS), 2.0% by weight of a sterically hindered hydroxyphenylalkylphosphonic monoester (HPPME), or 0.5% by weight of an aromatic trisamide (TA), based on the weight of polymer.

These mixes are individually compounded using a Leistritz 27 mm twin screw extruder. The melt is cooled in water a trough and the strand is converted into pellets via a Conair—Jetro Model 304 pelletizer. The pellets collected are considered the masterbatches.

Polypropylene is tumble mixed with the appropriate amounts of masterbatch and a present hindered hydroxylamine ester (HHAE) for each of the evaluations. The tumble mixing is via Marion Mixer SPS 1224 which is a paddle type slow RPM mixer. These are considered the final mixes.

Final mixes at 45 Kg each are converted into melt blown nonwoven textiles using a 500 mm Reifenhäuser Melt Blowing Pilot Line. The polypropylene webs are then treated by corona discharge.

The samples are tested using TSI Filter Tester (Model 8130) in which sodium chloride aerosol is sprayed at 32 liters per minute using a test area of 100 cm$^2$.

Results are found in the following Tables.

1) PP (MFI 35)

| Formulation | Basis Weight (g/m$^2$) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (PP)/3% HHAE | 30.8 | 27.4 | 91.4 | 84.9 | 7.2 |
| PP/3% HHAE/ 0.5% HALS | 30.9 | 39.9 | 93.6 | 86.0 | 8.2 |
| PP/3% HHAE/ 0.5% HPPME | 30.7 | 22.0 | 88.6 | 85.9 | 3.1 |
| PP/3% HHAE/ 0.05% TA | 30.7 | 27.0 | 90.9 | 89.5 | 1.6 |

2) PP (MFI 25)

| Formulation | Basis Weight (g/m$^2$) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (PP)/3% HHAE | 30.6 | 21.6 | 90.5 | 78.5 | 13.7 |
| PP/3% HHAE/ 0.5% HALS | 30.9 | 38.7 | 96.7 | 89.7 | 7.3 |
| PP/3% HHAE/ 0.5% HPPME | 30.8 | 40.9 | 97.5 | 96.5 | 1.0 |
| PP/3% HHAE/ 0.05% TA | 30.6 | 41.6 | 97.2 | 96.7 | 0.5 |

3) PP (MFI 12)

| Formulation | Basis Weight (g/m$^2$) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (PP)/2.5% HHAE | 30.8 | 41.3 | 85.9 | 74.3 | 13.5 |
| PP/2.5% HHAE/ 0.5% HALS | 29.6 | 21.7 | 80.4 | 59.4 | 26.1 |
| PP/2.5% HHAE/ 0.5% HPPME | 30.2 | 26.0 | 86.6 | 84.1 | 2.9 |
| PP/2.5% HHAE/ 0.05% TA | 30.1 | 29.7 | 86.8 | 84.8 | 2.3 |

The additives of the present invention are effective in providing polypropylene with thermal and charge stability, as measured by filtration efficiency and filtration efficiency loss.

hindered hydroxylamine ester (HHAE)

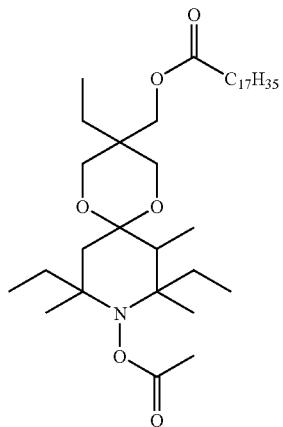

sterically hindered hydroxyphenylalkylphosphonic monoester (HPPME)

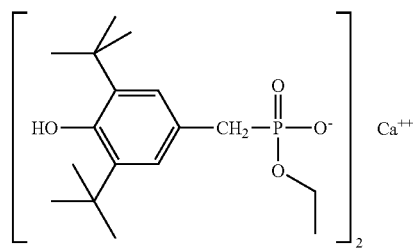

sterically hindered amine (HALS)

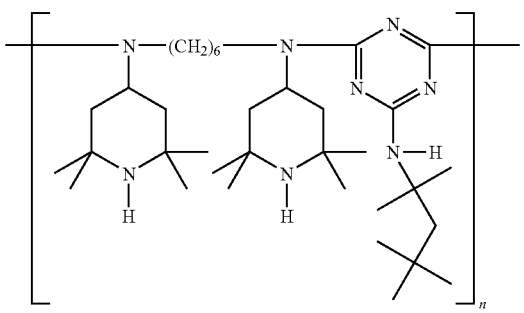

aromatic trisamide (TA)

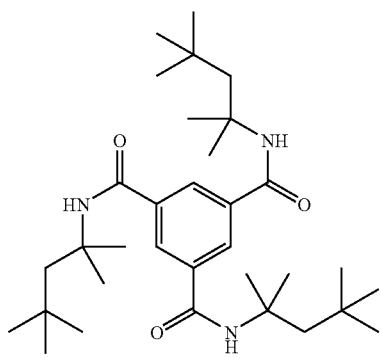

EXAMPLE 3

Example 2 is repeated, employing in addition to the present hindered hydroxylamine ester, 0.05% by weight of the aromatic trisamide

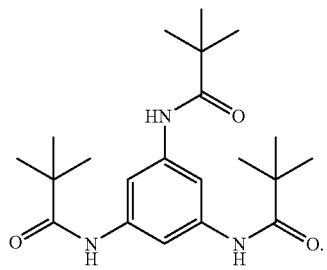

Excellent results are achieved.

What is claimed is:

1. An electret material with enhanced thermal and charge stability, which material has been subjected to an electret treatment, comprising
a thermoplastic polymer and
incorporated therein, an effective stabilizing amount of at least one hindered hydroxylamine ester compound of formula IC

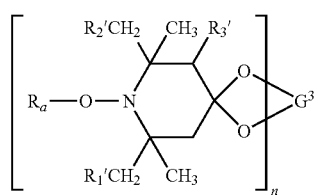

(IC)

where
n is 1 or 2, $R_a$ is acyl, $R_1'$, $R_2'$ and $R_3'$ are independently hydrogen or methyl; and
$G^3$ is $C_2$-$C_8$alkylene, $C_2$-$C_8$hydroxyalkylene or $C_4$-$C_{24}$acyloxyalkylene when n=1 or is the group $(-CH_2)_2C(CH_2-)_2$ when n=2.

2. An electret material according to claim 1 in which the thermoplastic polymer is polypropylene.

3. An electret material according to claim 1 in which the thermoplastic polymer is a nonwoven polypropylene web.

4. An electret material according to claim 1 wherein the electret treatment is a corona treatment.

5. An electret material according to claim 1 where
$R_a$ is acyl, $R_1'$, $R_2'$ and $R_3'$ are independently hydrogen or methyl and
$G^3$ is $C_2$-$C_8$alkylene or $C_4$-$C_{24}$acyloxyalkylene.

6. A method for preparing an electret material with enhanced thermal and charge stability, which method comprises
melt blending a thermoplastic polymer with an effective stabilizing amount of at least one hindered hydroxylamine ester compound of formula IC

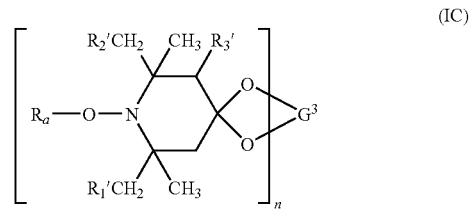

(IC)

where
n is 1 or 2, $R_a$ is acyl, $R_1'$, $R_2'$ and $R_3'$ are independently hydrogen or methyl; and
$G^3$ is $C_2$-$C_8$alkylene, $C_2$-$C_8$hydroxyalkylene or $C_4$-$C_{24}$acyloxyalkylene when n=1 or is the group $(-CH_2)_2C(CH_2-)_2$ when n=2 and
subjecting the blend to an electret treatment.

7. An electret material according to claim 1 wherein the thermoplastic polymer further has incorporated therein an additive selected from the group consisting of hindered amine light stabilizers, hydroxyphenylalkylphosphonic esters or monoesters and aromatic trisamide nucleating agents.

8. An electret material according to claim 1 wherein the thermoplastic polymer further has incorporated therein an additive selected from the group consisting of hindered amine light stabilizers.

9. An electret material according to claim 1 wherein the thermoplastic polymer further has incorporated therein an additive selected from the group consisting of hydroxyphenylalkylphosphonic esters or monoesters.

10. An electret material according to claim 1 wherein the thermoplastic polymer further has incorporated therein an additive selected from the group consisting of aromatic trisamide nucleating agents.

* * * * *